(12) United States Patent
Ovide

(10) Patent No.: US 8,595,257 B1
(45) Date of Patent: Nov. 26, 2013

(54) SYSTEM AND METHOD FOR IDENTIFYING ROMANTICALLY COMPATIBLE SUBJECTS

(76) Inventor: Christopher Brian Ovide, Chesapeake, VA (US)

(*) Notice: Subject to any disclaimer, the term of this patent is extended or adjusted under 35 U.S.C. 154(b) by 0 days.

(21) Appl. No.: 13/294,188

(22) Filed: Nov. 11, 2011

(51) Int. Cl.
    *G06F 17/30* (2006.01)

(52) U.S. Cl.
    USPC ........... 707/784; 715/789; 715/811; 382/116; 382/118; 340/5.52; 340/5.53

(58) Field of Classification Search
    USPC .................. 707/732, 733, 734, 784, E17.059, 707/E17.06, E17.044, E17.014; 715/789, 715/811; 382/118, 116, 115, 128; 705/14.44, 14.25, 14.66, 14.67; 340/5.52, 5.53, 5.81, 5.82, 5.83, 5.84
    See application file for complete search history.

(56) References Cited

U.S. PATENT DOCUMENTS

| | | | |
|---|---|---|---|
| 6,182,050 B1* | 1/2001 | Ballard ...................... | 705/14.61 |
| 2004/0243567 A1* | 12/2004 | Levy ................................. | 707/3 |
| 2006/0129383 A1* | 6/2006 | Oberlander et al. ............ | 704/10 |
| 2006/0286519 A1* | 12/2006 | Burnham et al. ............. | 434/236 |
| 2007/0239741 A1* | 10/2007 | Jordahl ........................ | 707/100 |
| 2008/0126426 A1* | 5/2008 | Manas et al. ................ | 707/104.1 |
| 2008/0249838 A1* | 10/2008 | Angell et al. .................... | 705/10 |
| 2008/0279419 A1* | 11/2008 | Kluesing et al. .............. | 382/100 |
| 2009/0037978 A1* | 2/2009 | Luque et al. ...................... | 726/2 |
| 2009/0070081 A1* | 3/2009 | Saenz et al. ...................... | 703/2 |
| 2009/0075738 A1* | 3/2009 | Pearce ............................ | 463/42 |
| 2009/0153552 A1* | 6/2009 | Fidaleo et al. ................ | 345/419 |
| 2009/0174526 A1* | 7/2009 | Howard et al. .............. | 340/5.52 |
| 2009/0177496 A1* | 7/2009 | Tuck et al. ......................... | 705/3 |
| 2009/0245603 A1* | 10/2009 | Koruga et al. ................ | 382/128 |
| 2010/0205541 A1* | 8/2010 | Rapaport et al. .............. | 715/753 |
| 2012/0069131 A1* | 3/2012 | Abelow ........................ | 715/753 |

OTHER PUBLICATIONS

Nachiappan Nagappan, Brendan Murphy and Victor Basili—"The influence of organizational structure on software quality: an empirical case study"—Proceeding CSE '08 Proceedings of the 30th international conference on Software engineering—2008—pp. 521-530.*

Michael Davis, Stefan Popov, and Cristina Surlea—"Real-Time Face Recognition from Surveillance Video"—Intelligent Video Event Analysis and Understanding Studies in Computational Intelligence vol. 332, 2010, pp. 155-194.*

* cited by examiner

*Primary Examiner* — Jean B Fleurantin
*Assistant Examiner* — Anh Ly

(57) ABSTRACT

A computer implemented matching method for matching a user with one or more romantically compatible users of the method. In one example the method comprises: receiving a profile generated by recording user choices from a field of images displayed to the user; applying a logistics regression model to the image choices to determine compatibility between two users. Creating a baseline template of the user's aesthetic preferences then applying this model to templates created from other users of the method. Any results within a desired confidence level are returned to the user. For mutual compatibility the user's own image is compared to that of the query's preference template to determine the presence of mutually compatible aesthetic attraction. Users can also use facial recognition to run personality test on themselves or potential matches to determine a if there is personality compatibility to the combination as well.

3 Claims, 3 Drawing Sheets

SYSTEM AND METHOD FOR IDENTIFYING ROMANTICALLY COMPATIBLE SUBJECTS

TECHNICAL FIELD

The present invention, in some embodiments thereof, relates to Internet or network based matching making, marketing or dating services.

BACKGROUND OF THE INVENTION

The present invention improves upon current online, Internet or Network based matching making or dating services. Currently available online dating services contain mainly search only engines and offer limited compatibility features. Those that do purport to include a compatibility match system typically do so under the guise of a personality or demographic test requiring user inputs based on qualitative descriptors subject to limitations severely limiting the objectivity of the matching function. These limitations occur most often in the inaccuracy of prompted questions and the misinterpretation of the questions for various reasons including language or cultural differences in interpretation. In addition the range of choices offered to the users are general and vague based on terms such as "like" or "favorite" and as such limits the ability of a predictive model to truly discern a user's ideal of aesthetic attraction.

Attraction is based upon many factors, including variances in the five perceptible senses. We teach that compatible attraction can be mathematically determined by the initial attraction to the face of other users of the method and by recording choices of the user against a field of potential images, we can objectively determine a user's aesthetic preference more accurately than existing methods which depend more on subjective rankings or matching two independent images rather then probability of attraction to one image based on pre recorded preferences found in other images. To more accurately match two individuals, a multi-factor algorithm is then utilized and must include a combination of matching factors weighted more or less to mimic an individual's personal preference. Individuals preferences can take on a wide range of factor's but particularly as a set of facial features, which we teach is based on or for personality or demographic elements as a composite score of overall mutual attraction The use of the word "match" in the majority of online dating systems is therefore erroneously used in one of two ways: the "matching" algorithm is too simplistic to ethically market the system as a predictor of compatibility or the matching system is based on a single parameter such as personality and provides no result relevant to the likelihood of overall romantic compatibility between two individuals nor do current methods prove accurate as predictive models of attraction.

Aesthetic attraction is typically the most important component of initial attraction. Long-term compatibility should be deconstructed so that a phase of sense-based attraction is accounted for as well as a personality/interests phase, where attraction becomes long lasting. The method of the present invention is designed to provide long-term compatibility, although its utility in facilitating and enhancing the mobile dating experience and predicting initial attraction is undeniable.

BRIEF SUMMARY OF EMBODIMENTS OF THE INVENTION

The present invention, in some embodiments thereof, relates to a computer implemented matching method for matching a user with one or more other users of the method. The method is operable on a server comprising a processor and memory and connected to a network. The method comprises: receiving a profile generated from a series of inputs into prompts requiring a users of the method to upload a photograph of themselves and then, prompts comprising a request for PIM locational identification; for matching two separate users by geographic proximity; generating a personality score receiving an image of the user; performing a facial recognition process on the image and storing a result of the process on the server for matching with other users of the method; users of the method are then presented with a field of images, such as on mobile applications as found on Facebook, Grindr, Growlr etc. The users choices of pictures are logged by the method and quantitative data including ranking of choice, number of choices per field, time between choices, time of viewing image, and similarity of facial features of choices is all recorded. The method then preforms a facial recognition process on the image template storing the result of the process on the server and searching a database of images of other users of the method against the template and returning users matching the template above a threshold level as determined by the weighting factors described above. The process then returns a search result to the user comprising a field of other users of the method based on a compatibility score with other users wherein the compatibility score is determined by the image template search, a weighting and morphing into a single template of all choices of the users to be used as the search template rather then individual templates for each chosen face, users being prompted as to whether or not a personality analysis should be included in search parameters, and the mutual compatibility match number. The mutual match number being determined by the likelihood the identified other users of the method would find the querant mutually attractive. Users are allowed to determine whether they are utilizing the process as a search or for the purposes of mutual compatibility, either being an advancement over current methods.

In a variant, referring to FIG. 2, the method comprises: prompting users of the method to input up to three template images the user finds attractive; generating a 3-D image template based on the images using a facial recognition process; receiving images from the users in response to the prompt; storing the images in a template database; performing a search using each template to generate a ranking of the highest match scores between the template and facial images of other users; and returning a search result of users based on a combination of facial recognition match of the templates and compatibility match number.

In another variant, the image of the user is a video of the user containing images of the user's face and containing a time stamp. A facial recognition process is performed on the video of the user's face. A 3-D template is generated for matching the user with the preferences of other users of the method. The video is provided for verification purposes as well as provide an advertisement of the user to other users of the method.

In a further variant, the uploaded image is a 2-D image and the 2-D is operated on by a facial recognition process that extracts a 3D image using an image extracting process or is combined with a generic 3D model to render a viable search template.

In still another variant, a database of user image templates is searched against the image of the user and the recorded preferences of the user in choices of the user as described in paragraph 0001 and results are returned based on a match threshold level which is set as a confidence interval comprising a 95% or higher degree of confidence that the user will find another user of the method to be attractive. Once a degree of attraction is confirmed for the querant the other logged facial template and quantitative data of the identified users are then run against that of the querant to determine a mutual match. Should a mutually compatible match be determined both users are contacted (i.e. email, text or sms) and given the option of opening a dialogue of communication or meeting.

In yet a further variant, the match threshold lever is returned and displayed in one of three categories comprising low 90% match, medium 95% match or high 99% match.

In another variant, the users of the method select the desired threshold level of compatibility for a match user to be included in a search result.

In a further variant, the user is presented with an option to increase match significance by adding one or more additional filtering processes comprising one of: a vocal based recognition process, a saliva based recognition process, a DNA based compatibility process, a scent based compatibility process. The method further comprises: prompting the user to take a test covering the selected filter; and searching a database of users having the same filter criteria against the test result and returning a search result based on the selected threshold level of matching selected by the user conducting the search.

In still another variant, the method further comprises presenting the user with the option to base a personality score on a result of a facial recognition process on an uploaded image; and computing a personality score based on the result of a facial recognition process.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
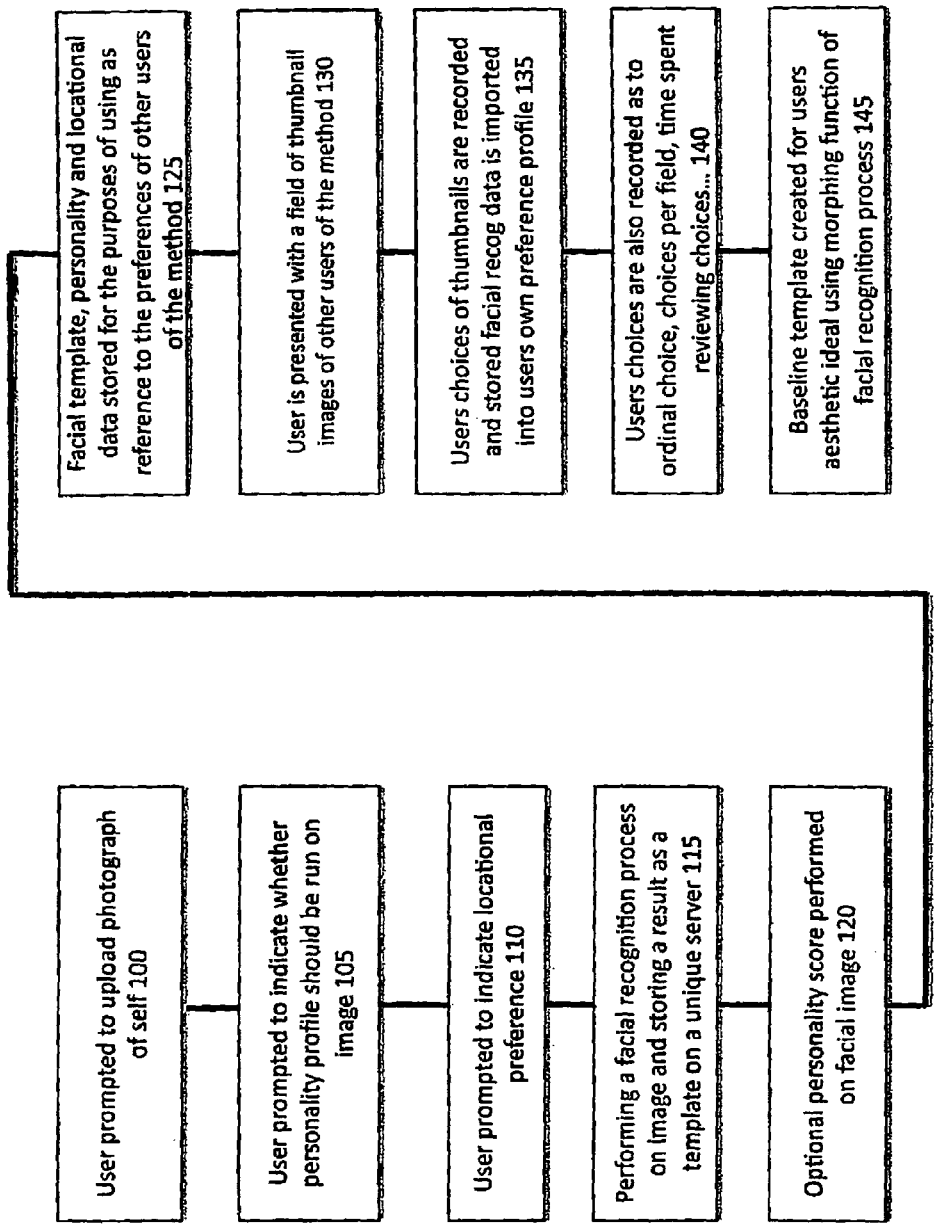
FIG. 1 is a flow chart of an example embodiment in accordance with the principles of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein over the definition that is incorporated herein by reference.

The present invention relates to a computer implemented method and system for matching users of the system according to compatibility for a romantic relationship. The system utilizes one or more unique algorithms, techniques and computer implemented processes designed to be used by internet accessible romantically uncommitted individuals (singles) in searching the internet on stationary or mobile devices with the intention of locating, evaluating and communicating and meeting with other like minded or compatible singles either locally or worldwide.

In one variant, the system begins a process of finding potential matches for a user by prompting the user or potential subscriber over a network to create a basic user profile with geographic location information of the user, a five or more second video camera clip (used to date and time stamp for verification purposes as well as provide a visually compelling advertisement of the person) or a picture to be used in various means including the creation of a template used for a facial recognition and detection process utilized by the system.

In one particular variant, the user is prompted as having personality profile extracted from his or her facial features with the results, having in one example, seven or more personality dimensions.

These three products and their subsequent compatibility scores combine to create our basic core service. In a variant, the user presented with a field of thumbnail images, such as found on many mobile devices and social networking applications. The user's choices from amongst the field of pictures are then recorded having a template created by utilizing a facial recognition process. All of the chosen faces are morphed into a single template which serves as the mean for the users aesthetic preference or mathematically expressed with the variable Y. Additional choices are then recorded and their data logged to be used in creating a baseline template of attraction for the user. The consequent template is then constructed by adding future choices of the user and weighting each new choice against the mean to ordinal rank, time between choices, time spent reviewing picture, number of choices per field etc which represent the dependent variables in a regression model or mathematically the variable X. This information is then used as a template against which the system uses to search a library of stored templates of other users of the method for identifying a matching profile based on the percentage match of multiple different facial nodes. For example, forty facial nodes. This template is then combined with personality and locational data to predict the likelihood of mutual attraction between two individuals. The algorithm fits the user's choices against the slope of a line determined by binomial regression and logistic regression as a predictor of attraction and mutual compatibility. The data is input into a binomial regression model comprising of an equation:

$$L(Y|\mu) = \prod_{i=1}^{n} (1_{y_i=1}(\mu_i) + 1_{y_i=0}(1 - \mu_i)),$$

where L=likelihood of an event occurring, Y=attraction given M or the mean of the users choices. The second half of the equation describes in more detail how this is determined through the use of multivariate regression, 1y1 representing a yes choice in a binomial system and 1y1=0 being the not set or false. In laymens terms the likelihood of a match is predicted by fitting the response to binomial questions (yes, no) along the slope of a line used to represent our confidence in a users predicted level of attraction to that of other users of the method. This allows for an interpretation of multivariant data along a binomial probability function. Given the limits inherent in simple linear regression as a predictive tool we utilize a logistics function to model the relationship between the probability and the explanatory variable, x (variance to mean of facial template, ordinal rank, time of choice etc) to that of y and using logistics to discriminate between the causal relationship inherent between the dependent and the independent variable. The resulting matches can then, if the result also meets the identified match's preset facial image template so that the match is mutual, be returned as results or be passed through secondary filters of demographic matching and personality matching.

If two users' matching criteria culminates into a mutually compatible match then both of their profiles are sent to the identical users, providing not only a matching percentage but an analysis on the two persons' psychological compatibility along with that of any of a plurality of advanced services.

In another variant, the system provides a social networking website allowing the above services/products to be used in conducting searches for like minded persons seeking friendship or activity partners.

In a further variant, the system combines a face recognition process (such as one currently available by Luxand Face SDK) and additional methods to create a product that involves the combination of facial recognition with online photo libraries, user preferences, profile questionnaires, demographic matching, vocal, scent, dna and the other matching criteria available on the system.

The face recognition process may be a cross-platform face detection and recognition library that can be integrated into an application. The face recognition process utilizes an API (Application Programming Interface) to detect a face and facial features and to match faces. Following face detection, the process provides the coordinates of 40 facial feature points for further processing. For example, the facial feature points include eyes, eye corners, eyebrows, mouth corners and nose tip. The library is web-cam capable, and able to retrieve frames from compatible cameras.

The process may have the following technical specifications:

Method utilizes robust frontal face detection including the detection of multiple faces in a photo including head rotation support by −30 . . . 30 degrees of in-plane rotation and −30 . . . 30 degrees out-of-plane rotation; Determines in-plane face rotation angle; Facial Characteristic detection speed is as fast as 370 frames per second*, depending on resolution. With a realtime detection speed of 0.0027 sec (370 FPS)* and a webcam resolution of −15 . . . 15 degrees of in-plane head rotation. Giving a reliable detection of 0.7 sec with a digicam resolution of −30 . . . 30 degrees of in-plane head rotation. The returned information for each detected face is given as (x,y) coordinates of face center, face width and rotation angle; easy configuration of face detection parameters is determined by Face Matching; the matching of two faces at given FAR (False Acceptance Rate) and FRR (False Rejection Rate) with an Enrollment time of 0.117 seconds (8.5 FPS)* (at webcam resolution) a template size of 16 kb and a matching speed The system has a matching speed of 30,000 faces per second and returns basic information corresponding to a facial similarity level.

Facial Feature Detection—The image is processed to determine specific nodes of an individual's face which are then used to calculate positive correlation when matched a against another facial image.

Detection of 40 facial feature points (eyes, eyebrows, mouth, nose, face contour) is indicated with a detection time of 0.59 seconds* (not including face detection stage) and an allowed head rotation of −30 . . . 30 degrees of in-plane rotation, −10 . . . 10 degrees out-of-plane rotation Method returns an information array of 40 (x,y) coordinates of each facial feature point or more for a given image.

Eye Centers Detection method is used to graph (x,y) coordinates of an individual's eye centers.

System detects eye centers only with a detection time of 0.067 seconds* (not including face detection stage)

The system returns information of two (x,y) coordinates one of the left eye center and another of the right eye center.

Library Size used in storing facial templates must meet capacity for effective implementation of the system allowing for storage of 10 MB or less although as functionality increases this figure may be revised either up or down.

The size of the redistributables does not exceed 10 MB for each platform.

In still another variant, for privacy and authenticity purposes the system requires a validated photograph of the user or current (for example, within 5 months) time stamped video clip of 10 seconds in duration from which a an individual user's personal face template is created as well as three templates of their preferred match's facial characteristics. The templates are generated based on the user uploading images of persons who the user deems aesthetically desirable. One face image is designated as an ideal aesthetically appealing image, a 10 on a scale of 1 to 10 as judged by the user. A second face image less aesthetically appealing, an 8 of 10 as judged by the user and a third face image less aesthetically appealing, a 6 of 10 is uploaded by the user. The video can be requested to be kept private though any potentially compatible subscriber can require the image be unlocked before a mutual match recommendation is made, after the facial templates are compared as well as the overall match score to determine mutual interest in both parties.

The number generated is considered the overall match number and is used to determine if a match report is sent to both users advising them that both profiles were mutually compatible according to both users' guidelines. A means for users to communicate with each other is provided, including but not limited to system guided communication, open anonymous speed-dating, no rules, and free form for users who feel comfortable with the match analysis and are willing to speak off site without further system involvement.

In yet a further variant, the system provides a virtual online environment. The environment may include avatars generated from by the system and includes not only the above matching criteria but also mutually created personalized video games that allow users to interact in similar methods to currently available games such as Family Sym, Zoo Sym, Amusement Park Sym etc as well as the creation of video games between compatible persons.

The system includes a personality profile feature. The personality profile is a uniquely designed test that may be based on a five dimensional personality model and may be based on 5 to 13 or more dimensions. In one example, the dimensions are extroversion/introversion, practicality, agreeableness, tough mindedness, conscientiousness, emotionality, and imaginativeness.

In one embodiment, a personality profile is run on the image and other images of users of the method. The results are shown on a bar graph with an explanation provided as a report to the subscriber with results also available to potential matches upon approval by prompt to share private info from the subject on either a case specific basis or based on a predetermined compatibility requisite score or a general acceptance by the users to share potential sensitive information.

The profile results are combined with locational data and facial recognition score to provide a composite score.

The compatibility match number operates as follows:

Users can combine two or more dimensions to effect a search on the system.

The first two parameters integrated automatically are personality and aesthetic compatibility.

Research and studies have shown that perception of the quality of a couple's first kiss can be a major determinant of compatibility. Particularly in women it is found that an acceptable and even delightful first kiss can increase feelings of romantic attraction and passion and provide a unique bond that factors into the strength of the match for years down the road. Couples that do not kiss or have low connection in that regard tend to have less comfortable, romantic relationships and are missing a major piece in what keeps relationships lasting in the long term.

In a variant, a questionnaire is administered requesting data on a person's kissing preference and technique, palette (using foods on a tri integer scale good/bad/ok), cultural norms in regards to kissing, value placed.

In a step, a saliva swab and analysis is used to quantify an individual's own palette score. In another step, the data is then used to generate a metric to be combined with the overall match factor compatibility score. Weighting is set at a default of 5% but can optionally be increased by the user. In a further step, a section is added to the questionnaire that automatically determines based on an analysis of each user's preference or indifference to kissing within the parameters of a building and maintaining a stable, rewarding relationship.

In another variant, DNA matching may be utilized by the system on a six point analysis for determining the biological compatibility of two singles. Current match technology only to utilizes the specific bio match algorithm without taking into account other factors which may invalidate a match. Consequently critics have identified this as spurious technology given the propensity for cultural or social preferences which create barriers not easily overcome just on the basis of biological attraction. The present invention solves for this by integrating the DNA match results specifically with the facial recognition and personality profile results which provides a holistic number.

This number is then either used as an "Icebreaker" in which any score/user who does not meet initial compatibility preferences is precluded from any match results or is integrated as a pro rata integer in the overall compatibility Match Factor. The weighting will be floating based on new data. Initially 50% of the overall match number.

In another variant, a social media application is designed to integrate and maximize the interaction between social media (for example, Facebook) and the system for seeking out matches on social media outside the system. The social media application may search members or non-members who have some relation or connection with the member on other social media (i.e. all users of a particular mobile social application site). In one embodiment, the application connects the database of the system and a facial recognition engine with social media profiles connected to a user. The user's choices amongst the field of provided images are categorized and recorded as to rank, time between choices, number of choices per field, time spent viewing a choice etc. A facial recognition process is then run against other users of the application. A predictive model is created comprising of the facial template of the users choices which have been morphed using standard facial recognition technology into a baseline model. The different choices are weighted as to the above criteria to accurately determine a model. Other factors are added such personality compatibility and location preferences and these are added into a binomial regression model comprising: $Y^* = X\beta + \epsilon$. to predict the likelihood of attraction or mutual compatibility between two users. Where Y=the response (confidence of attraction), X=predictive variable (time,face match,location). e=error rate and the B is the function feature general set to 1 if unknown.

Optionally, users engage the application and in turn are required to select specific friends' profile pages on the social media either manually or as part of a batch list selecting multiple profiles for review.

Optionally, the user is then prompted to provide one or more photographs of images representing an aesthetic 10, 8 or 6 used to create a reference template.

Optionally, the social media profile is then mined and profile pictures are sampled by the system creating templates for every non system member social media profile. This also allows the system to generate a numerical ID for each social media profile searched, consequently creating a database specifically made up of non subscriber social media users whose facial data can then be searched by subscribers of the system opening up another library of faces and potential contacts.

Optionally, once matches are determined the system automatically opens up a "add as friend" request box and pre-populates the message box with of the identified social media profile with information detailing the process and requesting the social media user to utilize services of the system as well as take the compatibility profile.

The identified social media user is then prompted to upload a picture which is compared to that of the system user and if an acceptable mutual match is found to exist the social media user is then prompted to accept the friend request as well as engage a holistic platform in clarifying what parameters are involved for determining mutual compatibility as well as searching for other matches.

In still another variant, a virtual dating booth is designed to allow users simulate interacting in person from remote locations. Users experience visual, aural, scent and touch sensation through the insertion of a silicon gel implant, metallic sensory device or pad designed specifically for brain to brain interface using connection to in-store booths or at home/mobile hardware.

Optionally, users receive a temporary or permanent silicon implant with 4 or more nerve connections. The implant is configured to send and receive mnemonic, EEG or ultrasonic data between two users including scent, touch and taste expressed in algorithmic form and transmitted between user's brains through focusing, imagining or stimulating users brain activity to direct interfaced users brain to experience physical sensation. Glasses and headphones are used to route visual and aural information between both individuals. Individuals may be seated in a chair and be given a choice of predesigned worlds/locations in a sound proof environment. Once inside a world, the implants and an algorithm will provide all necessary stimulation to recreate a date in real time including all 5 senses and electronic inputs to simulate motor and ambulatory events.

Optionally, all sensual information may be routed directly to the skin implant thus eliminating the need for hardware glasses and headphones to transmit the data.

Referring to FIG. 1, the present invention, in some embodiments thereof, relates to a computer implemented matching method for matching a user with one or more other users of the method. The method is operable on a server comprising a processor and memory and connected to a network.

The method comprises: receiving 100 a profile generated from a series of inputs, in particular a photograph of the user, into prompts displayed to the user and then, generating 105 a first personality score based on the photograph supplied by the user; receiving 110 a user generated response to prompts concerning the use of location data; generating 115 a template by performing a facial recognition process on the image and storing a result on a unique server; combining 120 optional personality score performed on the image; 125 the facial template, personality and locational data stored for the purpose of using data as a reference point in predicting mutual compatibility with other users of the method; 130 user is presented with a field of thumbnail images of other users of the method; recording 135 users choices of available thumbnails and storing facial recognition data of choices into user's own preference profile; additionally 140 recording user's choices as to ordinal rank, choices per each image field, time spent reviewing choices; creating 145 a baseline template of user's aesthetic ideal using morphing function of facial recognition process.

Figure 2:
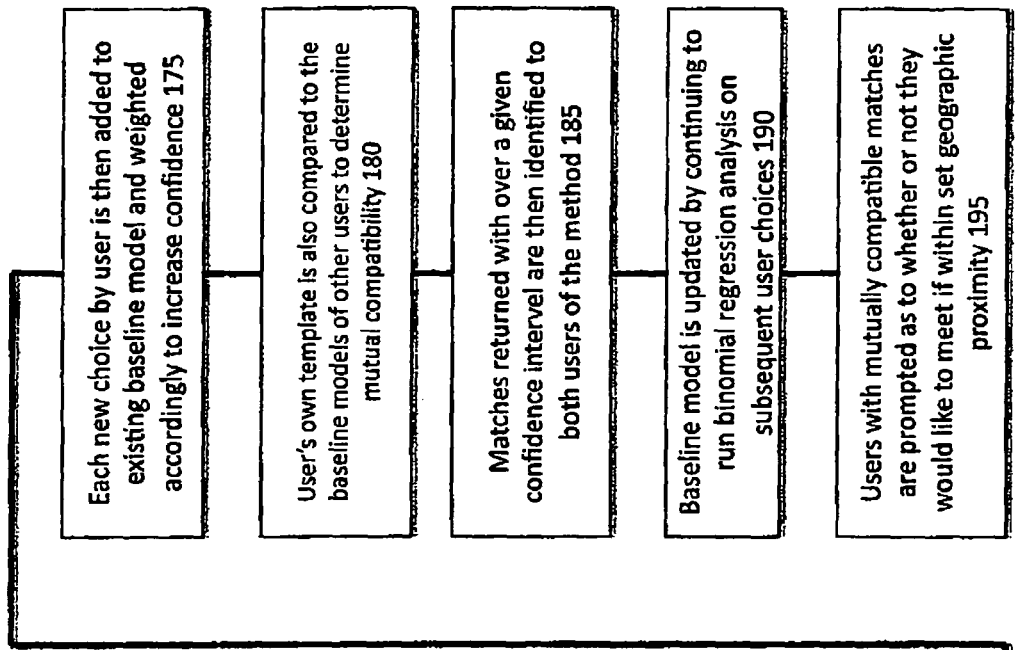
FIG. 2 is a flow chart of an example embodiment in accordance with the principles of the invention.
Figure 2:
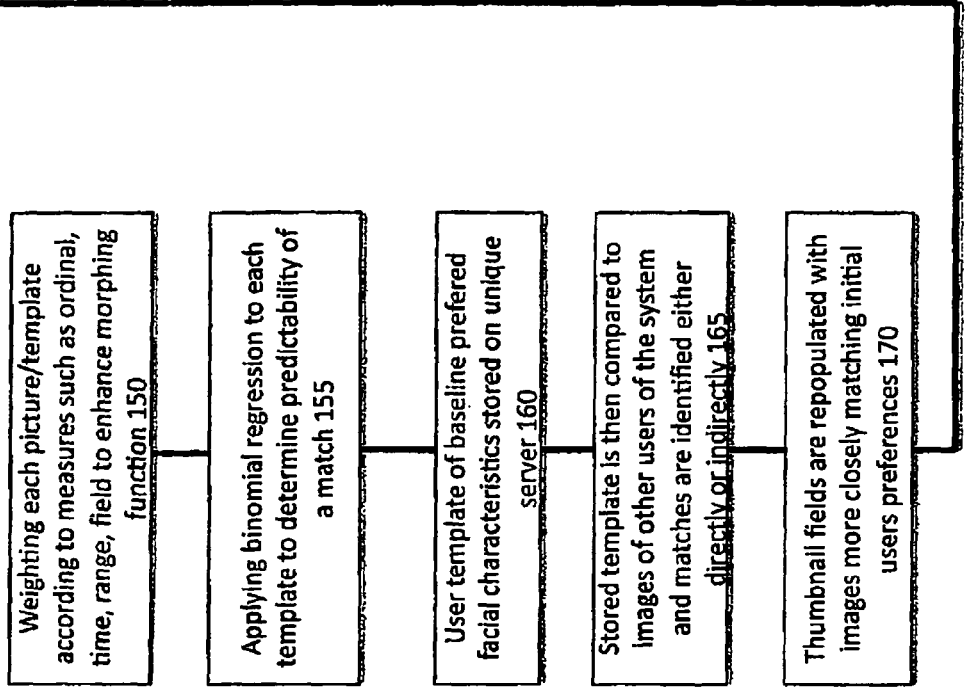

Referring to FIG. 2, the method comprises: weighting 150 each user identified image according to various measures including but not limited to ordinal, time, range field intended to enhance morphing function; applying 155 a binomial regression function to each image derived template to determine predictability of match; composite template 160 of user's baseline preferred facial characteristics stored on unique server; comparing 165 stored template to images of other users of the method and identifying matches either directly or indirectly; repopulating 170 thumbnail fields on user interface with images more closely matching initial the initial preference's of the user; including 175 each new choice to existing baseline model and weighing each new choice accordingly to increase confidence level of prediction; comparing 180 user's own template to the baseline models created for other users of the method in order to predict mutual compatibility; identifying 185 matches which are returned over a given confidence interval and match prediction is supplied to both users of the method; updating 190 baseline model by performing a binomial regression function on subsequent user choices; prompting 195 users with compatible matches as to whether or not they would like to meet if within set geographic proximity.

Figure 3:
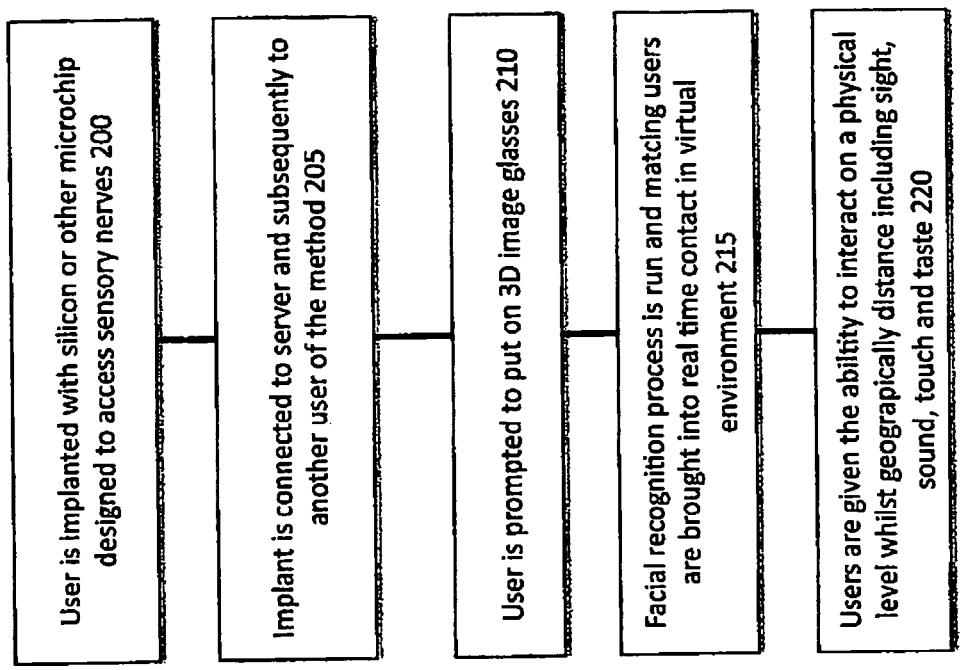
FIG. 3 is another optional variant of the invention.

In a further variant, referring to FIG. 3, the user is implanted with a silicon or other microchip designed to access sensory nerves 200. The method further comprises: connecting 205 the implant to a server and subsequently to another user of the method similarly attached to a network; and prompting 210 user to wear 3-D image glasses; running 215 a facial recognition process and matching users based on predicted mutual attraction, bringing matches into real-time contact in a virtually created environment; 220 users are provided the ability to interact on a physical level experiencing sensory perception over a geographical distances including sight, sound, touch and taste.

In still another variant, the method further comprises presenting the user with the option to base a personality score on a result of a facial recognition process on an uploaded image; and computing a personality score based on the result of a facial recognition process.

In yet a further variant, an advertising method is provided for generating advertisements individually tailored to a user of a network, comprising; receiving one or more template images of a human face having facial characteristics assumed to be desired by the user in a match identified by recording a user's click throughs and or selections of visual images on a database of uploaded facial images of other persons primarily from a dating or social networking website, or other site; creating a template of each face selected by the user and weighting these images as to the number of selections of a single profile or individual's images and generating a composite template by the use of a facial recognition morphing process to create a individualized facial feature preference model; the model is then used to search a database of advertising images which can then be compared to each individual's preference search template using a facial recognition process returning the strongest match; the advertisement models with the strongest match then appear in advertisements presented to the user as the user views pages on the network or alternatively in the case of dating sites are used to populate an individuals home page with images which are perceived to be aesthetically appealing to the user.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration

What is claimed is:

1. A computer implemented matching method, for matching a user with one or more other romantically compatible users of the method, operable on a server comprising a processor and memory and connected to a network, comprising:
prompting user to upload personal photograph of self;
prompting user to indicate whether he or she would like a personality analysis run on profile photograph;
prompting user to indicate locational preference and geographic proximity to desired matches;
receiving an image of user;
receiving answers to a personality profile from an analysis of personality determined by facial features;
generate a personality score for user based on facial characteristics;
performing a facial recognition process on the image and storing the result of the process on the server as a template on a unique server with the intention of the using as a reference to match, with a baseline template of the aesthetic preferences of other users;
receiving a template image comprising an image of a human face and storing a result of the process on the server for matching with other users of the method;
presenting a field of thumbnail images of other user's of the methods photographs to user;
user is expected to choose photographs of other users of the method out of field, most likely thumbnails on a mobile device;
performing facial recognition processes on the chosen faces and creating a template for each including additional data such as ordinal choice in field, time between screen populated and choice, time between second choice, third number of choices per screen and number of pictures actually chosen and storing the process on the server;
create baseline template for a user's aesthetic ideal using a facial recognition morphing function using all chosen pictures;
weighting each picture according to above measures, ordinal, time, range, so that morphing function creates a more accurate baseline facial template;
applying the following binomial regression equation to each subsequent template to determine predictability of:

$$L(Y|\mu) = \prod_{i=1}^{n} (1_{y_i=1}(\mu_i) + 1_{y_i=0}(1-\mu_i));$$

where L=likelihood of an event occurring,
Y=attraction given M or the mean of the users choices,
the second half of the equation describes in more detail how this is determined through
the use of multivariate regression,
1y1 representing a yes choice in a binomial system and
1y1=0 being the set or false,
user then has one template of aggregate, preferred facial characteristics that to compare the individual templates of other users of the methods to determine a match;
alternatively a template is created by determining mode of choices and morphing baseline template from all applicable images;

determining mode and mean of choices and running standard deviation of each with which to create sample population for user which is then applied and updated to subsequent image fields;

recording future choices and repeating the process to fine tune baseline facial template;

processing database of users and returning field of images to querant within one degree of standard deviation from mean or mode;

processing each image using threshold and predictability of matching variables at certain confidence intervals utilizing;

$$Y^* = X\beta + \epsilon$$

*Where Y=the response (confidence of attraction), X=predictive variable (time, face match, location), $\epsilon$=error rate and the $\beta$ is the function feature general set to 1 if unknown;

recording choices of user and repopulating field of images with tightening degree of accuracy based on process in claim one;

assigning chosen each image a z score;

determining most accurate method of matching by comparing subsequent choices using either binomial or latent regression models template match's mean, mode or other factors and assessing method best suited to predict user compatibility by then creating binomial distribution table to determine potential for mutual compatibility.

2. The method of claim 1, wherein the user is presented with a series of prompts and is requested to input information regarding the user's kissing techniques and preferences, the method further comprising:

delivering a swab sample set to user and requesting the user to swab the inside of their cheek for providing a DNA enriched saliva sample;

processing the saliva sample to return genetic information including potential genetic compatibility with other users;

providing the user with a ID number wherein the user's sample is available on the server to be processed and matched against other users IDs for compatibility matching purposes;

combining the kissing profile with that of the saliva test and matching that against other users profiles and test;

returning compatible match results to user; and the method further comprising: aggregate outlying data to determine if there is any secondary or tertiary facial type's user would be attracted to and applying claim one to these to determine if there is any alternate template possible to that of the baseline.

3. The method of claim 1, the method further comprising:

process of claim 1 where user's image is populated onto that of their preferred choices screen/s and that user/s choice/s and preferences are recorded;

compatibility is then determined based on threshold determined by program and weighted at a confidence interval;

users are prompted to indicate if they are free or interested in meeting, chatting, or just looking for the future;

any individual users whose combined scores fall within the 95% or above confidence interval for a mutual match result in both users being contacted through email, short message service (SMS) or other means that a mutual match is available and inside the required geographic proximity.

* * * * *